US011757324B2

(12) United States Patent
Tsai et al.

(10) Patent No.: US 11,757,324 B2
(45) Date of Patent: Sep. 12, 2023

(54) ROTARY MOTOR STATOR

(71) Applicant: DELTA ELECTRONICS, INC., Taoyuan (TW)

(72) Inventors: Cheng-Hsun Tsai, Taoyuan (TW); Yung-Chih Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 25 days.

(21) Appl. No.: 17/449,948

(22) Filed: Oct. 4, 2021

(65) Prior Publication Data
US 2022/0376580 A1    Nov. 24, 2022

(30) Foreign Application Priority Data

May 19, 2021    (CN) .......................... 202121067057.5

(51) Int. Cl.
*H02K 3/52*    (2006.01)
*H02K 3/50*    (2006.01)
*H02K 5/22*    (2006.01)

(52) U.S. Cl.
CPC .............. *H02K 3/522* (2013.01); *H02K 3/50* (2013.01); *H02K 3/52* (2013.01); *H02K 5/225* (2013.01)

(58) Field of Classification Search
CPC ............ H02K 3/522; H02K 3/52; H02K 3/28; H02K 3/50; H02K 5/225; H02K 5/22; H02K 5/02
USPC ........................................................ 310/71
See application file for complete search history.

(56) References Cited

U.S. PATENT DOCUMENTS

| | | | | |
|---|---|---|---|---|
| 7,965,012 B2* | 6/2011 | Murakami | ............. | H02K 3/522 |
| | | | | 310/194 |
| 2004/0007934 A1* | 1/2004 | Michaels | ............... | H02K 3/522 |
| | | | | 310/91 |
| 2004/0183388 A1* | 9/2004 | Rittmeyer | ................ | H02K 3/28 |
| | | | | 310/179 |
| 2011/0037339 A1 | 2/2011 | Rahman et al. | | |
| 2015/0333590 A1* | 11/2015 | Yoshida | ................. | H02K 3/522 |
| | | | | 310/71 |
| 2017/0018992 A1* | 1/2017 | Li | ........................... | H02K 21/16 |
| 2019/0273414 A1* | 9/2019 | Cheung | .................... | H02K 5/15 |

FOREIGN PATENT DOCUMENTS

| | | |
|---|---|---|
| CN | 102246390 A | 11/2011 |
| CN | 107979263 A | 5/2018 |
| CN | 105186726 B | 6/2018 |
| TW | 201347358 A | 11/2013 |
| TW | I533566 B | 5/2016 |

* cited by examiner

*Primary Examiner* — Alexander A Singh
(74) *Attorney, Agent, or Firm* — CKC & Partners Co., LLC

(57) ABSTRACT

A rotary motor stator includes a plurality of stator teeth and a plurality of terminal securing blocks. The stator teeth are arranged in a ring to define a rotor accommodation space. Each stator tooth includes an inner side, a winding section and an outer side. The inner side is closer to the rotor accommodation space than the outer side, and the winding section is located between the inner side and the outer side for winding a coil. Each terminal securing block is fixed to the outer side of each stator tooth, and each terminal securing block includes a first wire slot configured to secure an end of the coil. An angle between a line passing through a center of the ring and a center of each terminal securing block and a lengthwise direction of the first wire slot is an acute angle.

16 Claims, 9 Drawing Sheets

ROTARY MOTOR STATOR

CROSS-REFERENCE TO RELATED APPLICATION

This application claims priority to China Application Serial Number 202121067057.5, filed May 19, 2021 which is herein incorporated by reference in its entirety.

BACKGROUND

Field of Disclosure

The present disclosure relates to a rotary motor stator.

Description of Related Art

A stator assembly of a conventional rotating motor includes a plurality of stator teeth. Each stator tooth is made of silicon steel sheets stacked with an insulating plastic shell housing the stacked silicon steel sheets. Copper wires are wound on the plastic shell and a connection length of each copper wire is reserved.

SUMMARY

The present disclosure provides a rotary motor stator to deal with the needs of the prior art problems.

In one or more embodiments, a rotary motor stator includes a plurality of stator teeth and a plurality of terminal securing blocks. The stator teeth are arranged in a ring to define a rotor accommodation space. Each stator tooth includes an inner side, a winding section and an outer side. The inner side is closer to the rotor accommodation space than the outer side, and the winding section is located between the inner side and the outer side for winding a coil. Each terminal securing block is correspondingly fixed to the outer side of each stator tooth, and each terminal securing block includes a first wire slot configured to secure an end of the coil. An angle between a line passing through a center of the ring and a center of each terminal securing block and a lengthwise direction of the first wire slot is an acute angle.

In one or more embodiments, a rotary motor stator includes a plurality of stator teeth and a plurality of terminal securing blocks. The stator teeth are arranged in a ring to define a rotor accommodation space. Each stator tooth includes an inner side, a winding section and an outer side. The inner side is closer to the rotor accommodation space than the outer side, and the winding section is located between the inner side and the outer side for winding a coil. Each terminal securing block is correspondingly fixed to the outer side of each stator tooth, and each terminal securing block is located between a center and an edge of the outer side of each stator tooth.

In one or more embodiments, the angle ranges from 10° to 85°.

In one or more embodiments, the center of each terminal securing block is not located in a center of the outer side of each stator tooth.

In one or more embodiments, the rotary motor stator further includes a plurality of terminals, and each terminal is inserted into a corresponding one of the terminal securing blocks.

In one or more embodiments, each terminal includes a second wire slot, the first wire slot and the second wire slot are aligned to secure the end of the coil when each terminal is inserted into a corresponding one of the terminal securing blocks.

In one or more embodiments, a rotary motor stator further includes a tie conductor member connected to the terminals.

In one or more embodiments, the tie conductor member is located between the rotor accommodation space and the terminal securing blocks.

In one or more embodiments, the rotary motor stator further includes a metal ring frame to accommodate the ring of the stator teeth.

In one or more embodiments, a gap is formed between each terminal securing block and the metal ring frame.

In one or more embodiments, a gap is formed between any immediately adjacent two of the stator teeth.

In one or more embodiments, each terminal securing block includes a first wire slot configured to secure an end of the coil.

In one or more embodiments, an angle between a line passing through a center of the ring and a center of each terminal securing block and a lengthwise direction of the first wire slot is an acute angle.

In sum, the rotary motor stator disclosed herein has its wire slot of the terminal securing block in a skewed state, and the coil end clamped by the wire slot also has a skew angle, which increases an insulation gap between the coil end and the metal ring frame to avoid the problem of high-voltage arc discharge due to a close gap between the coil end and the metal ring frame. At the same time, increasing the distance between the terminal securing blocks and the rotor accommodation space may also widen the wiring area to avoid unnecessary interference when the rotor rotates.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
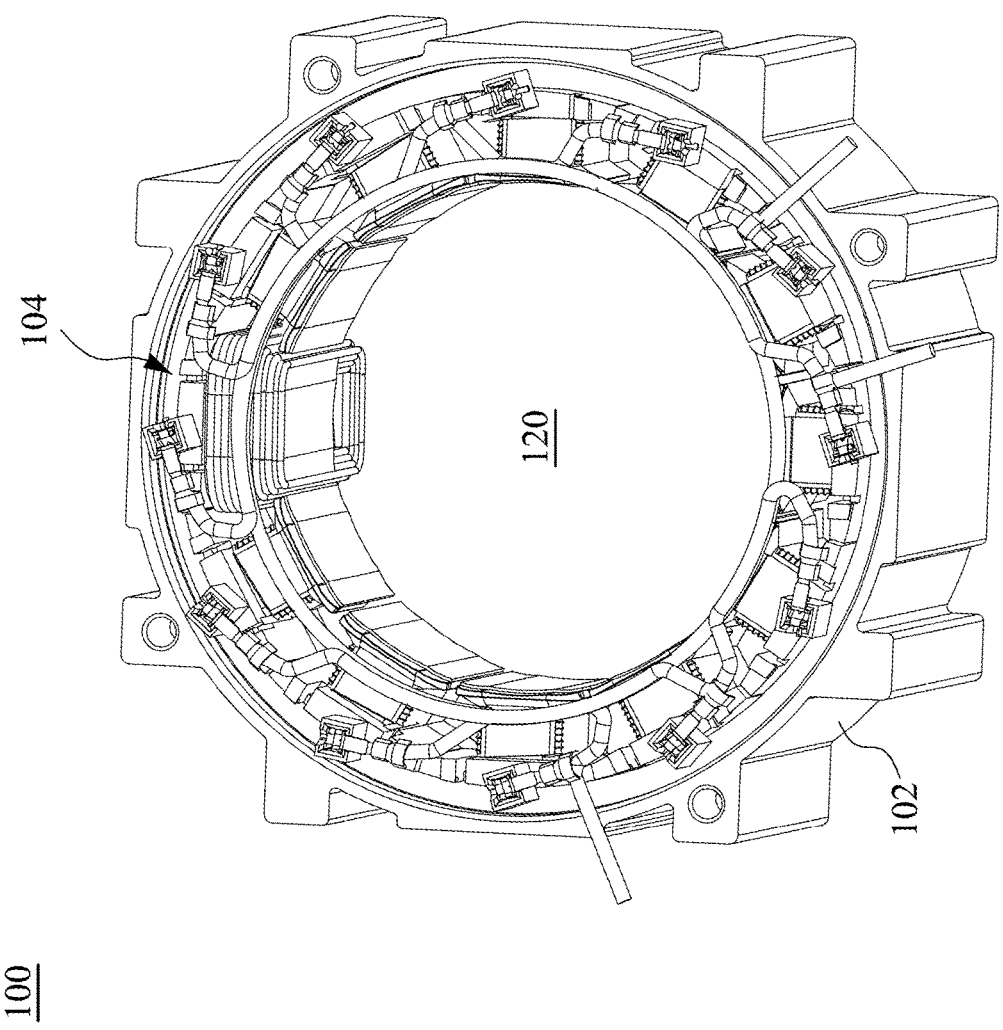
FIG. 1 illustrates a perspective view of a rotary motor stator according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which illustrates a perspective view of a rotary motor stator according to one embodiment of the present disclosure. A rotary motor stator 100 includes a metal ring frame 102 and a stator ring 104. A rotor accommodation space 120 is defined in a center of the stator ring 104 to accommodate a rotor (not shown in the drawings). When the rotary motor stator 100 is energized and excited, the rotor in the rotor accommodation space 120 is driven to rotate.

Figure 2:
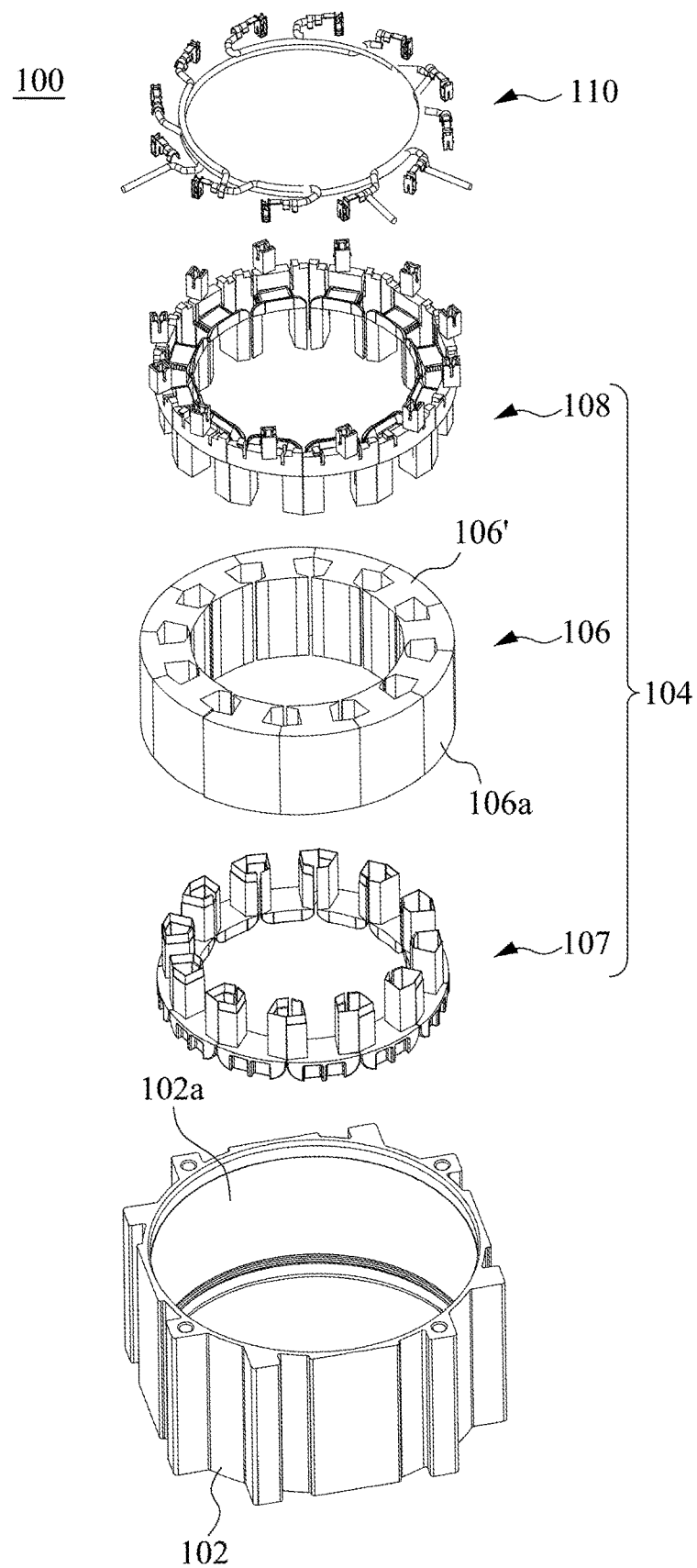
FIG. 2 illustrates an exploded view of a rotary motor stator according to one embodiment of the present disclosure.
Figure 3:
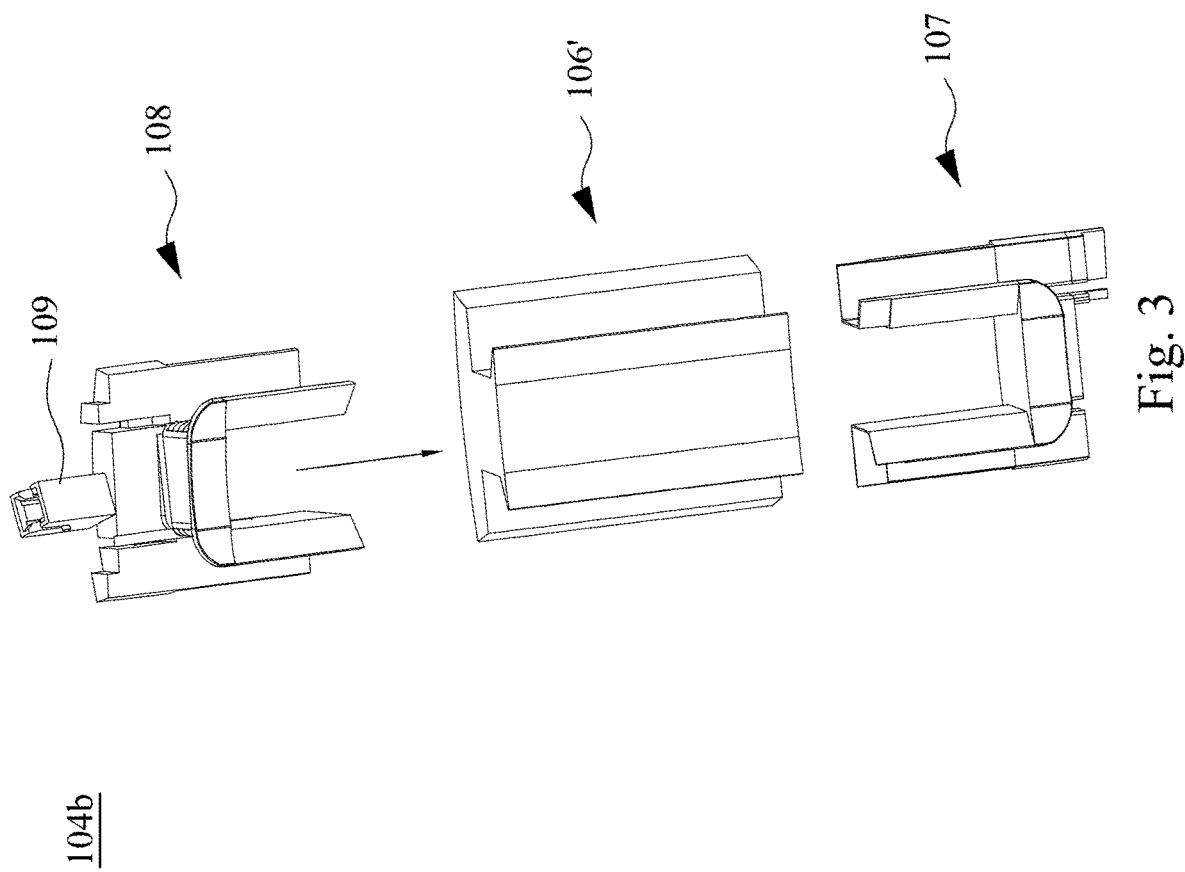
FIG. 3 illustrates an exploded view of a single tooth of a rotary motor stator according to one embodiment of the present disclosure.

Reference is made to FIGS. 2 and 3. FIG. 2 illustrates an exploded view of a rotary motor stator according to one embodiment of the present disclosure, and FIG. 3 illustrates an exploded view of a single tooth of a rotary motor stator according to one embodiment of the present disclosure. The stator ring 104 includes an iron core 106, a plurality of upper winding sleeves 108, and a plurality of lower winding sleeves 107. The iron core 106 is composed of a plurality of teeth 106' of the iron core, and each tooth 106' of the iron core can be made by stacking a plurality of silicon steel sheets. When the rotary motor stator 100 is assembled, each tooth 106' of the iron core is combined with a corresponding upper winding sleeve 108 and a corresponding lower winding sleeve 107, and a coil is then wound around the combined upper and lower winding sleeve (108, 107) to form a stator tooth 104b. Multiple stator teeth 104b are combined to form a circular stator ring 104, and an outer wall 106a of the iron core 106 is fitted to an inner wall 102a of the ring-shaped metal ring frame 102, thereby fixing the stator ring 104 in the metal ring frame 102. The rotary motor stator 100 also includes a tie conductor structure 110, which is connected to the wound coils in the winding frame (a combination of the upper winding sleeve 108 and the lower winding sleeve 107) to form a desired stator winding and supplies power the coil.

Figure 4:
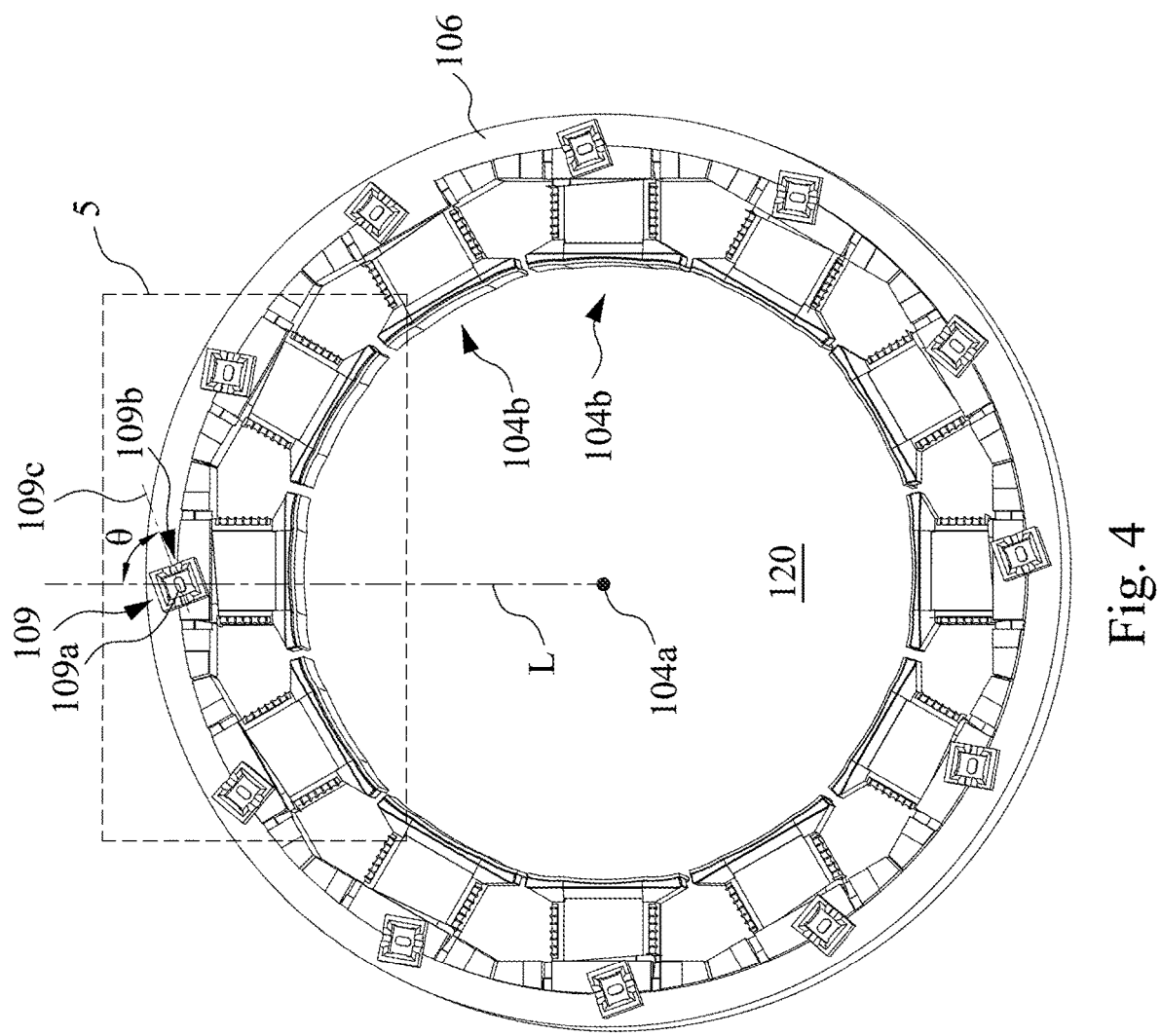
FIG. 4 illustrates a top view of a rotary motor stator with coils removed according to one embodiment of the present disclosure.
Figure 5:
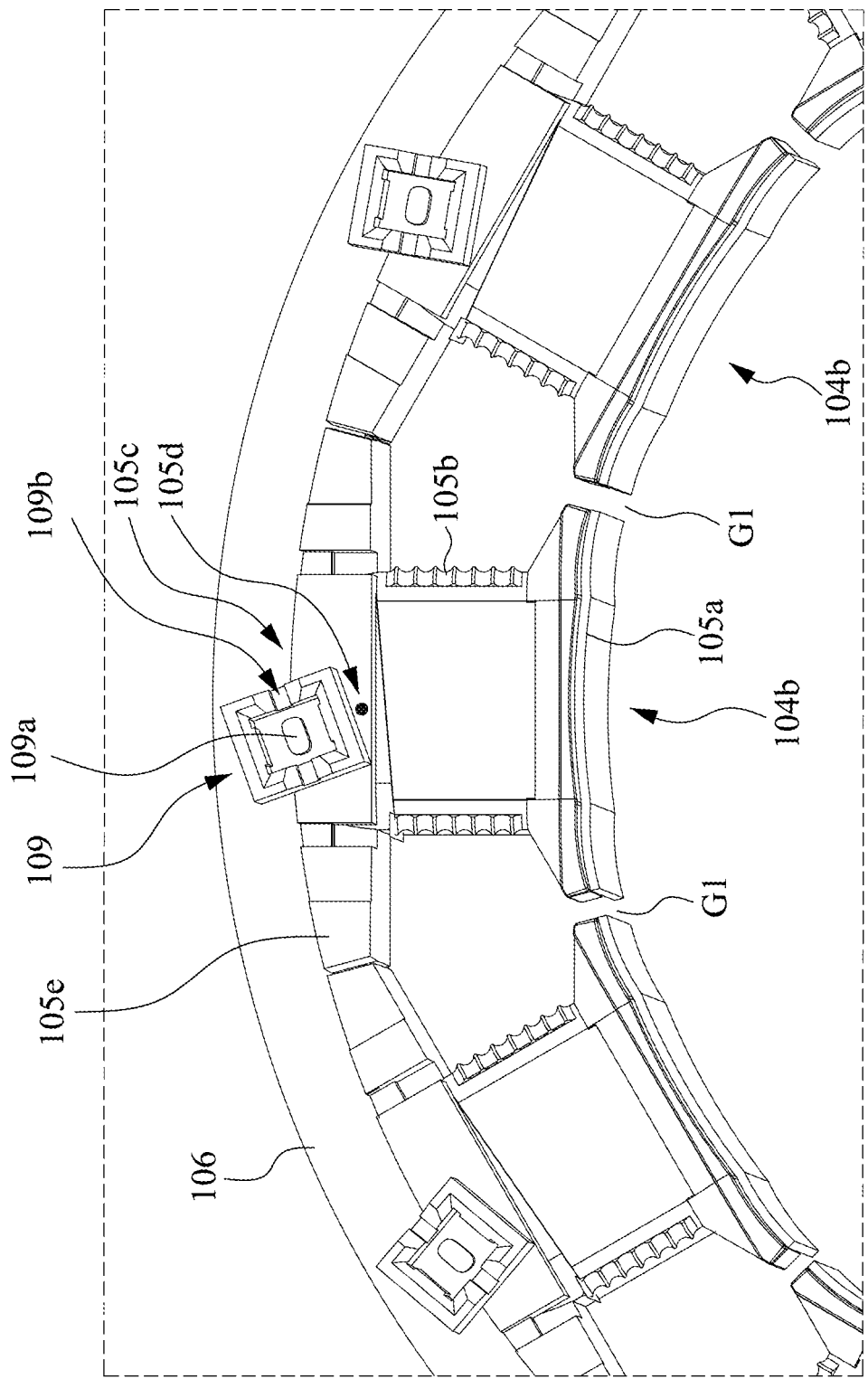
FIG. 5 illustrates an enlarged view of the rotary motor stator in FIG. 4.

Reference is made to FIGS. 3-5. FIG. 4 illustrates a top view of a stator ring 104 with coils removed according to one embodiment of the present disclosure, and FIG. 5 illustrates an enlarged view of the rotary motor stator in FIG. 4. The plural stator teeth 104b are arranged in a ring to define the rotor accommodation space 120. Each stator tooth 104b has an inner side 105a, a winding section 105b, and an outer side 105c. The inner side 105a is closer to the rotor accommodation space 120 than the outer side 105c, and the winding section 105b is located between the inner side 105a and the outer side 105c for a coil to wind. In some embodiments of the present invention, the upper and lower winding sleeves (108, 107) are made of insulating plastics, and the upper and lower winding sleeves (108, 107) are sleeved on a single tooth 106' of the iron core for winding the coil to avoid the coil from contacting the single tooth of the iron core 106'.

The rotary motor stator also includes a plurality of terminal securing blocks 109, and each terminal securing block 109 is fixed to the outer side 105c of each stator tooth 104b, and used as a wire connection function for the coil. In some embodiments of the present disclosure, a center 109a of the terminal securing block 109 is not located at a center 105d of the outer side 105c of each stator tooth 104b. In some embodiments of the present disclosure, the center 109a of the terminal securing block 109 is located between the center 105d and an edge 105e of the outer side 105c of each stator tooth 104b. In some embodiments of the present disclosure, the terminal securing block 109 and the upper winding sleeve 108 are an integrated insulating plastic body.

In some embodiments of the present disclosure, a space or gap G1 is formed between any immediately adjacent two inner sides 105a of the stator teeth 104b.

The terminal securing block 109 has a first wire slot 109b for securing an end of the coil, for example, one end of the coil is clamped and positioned in the first wire slot 109b of the terminal securing block 109. In some embodiments of the present disclosure, an angle θ between a line L passing through the center 109a of the terminal securing block 109 and the center 104a of the stator ring 104 and a lengthwise direction 109c of the first wire slot 109b of the terminal securing block 109 is an acute angle. In other words, the first wire slot 109b of the terminal securing block 109 is in a skewed state. In some embodiments of the present disclosure, the angle θ ranges from 10° to 85°, but is not limited to this. In some embodiments of the present disclosure, the angle θ is not 90° or a right angle. In other words, the lengthwise direction 109c of the first wire slot 109b of the terminal securing block 109 is not perpendicular to the line L. In some embodiments of the present disclosure, the angle θ is not 0°. In other words, the lengthwise direction 109c of the first wire slot 109b of the terminal securing block 109 is not parallel to the line L. When the angle θ is 90° or a right angle, the coil needs to reserve a longer wire end to be inserted into the first wire slot 109b of the terminal securing block 109. When the angle θ is 0°, the coil still needs to reserve a longer wire end to be inserted into the first wire slot 109b of the terminal securing block 109, and when a distance between the wire end of the coil and the metal ring frame is too short, a high-voltage arc discharge is likely to occur.

Figure 6:
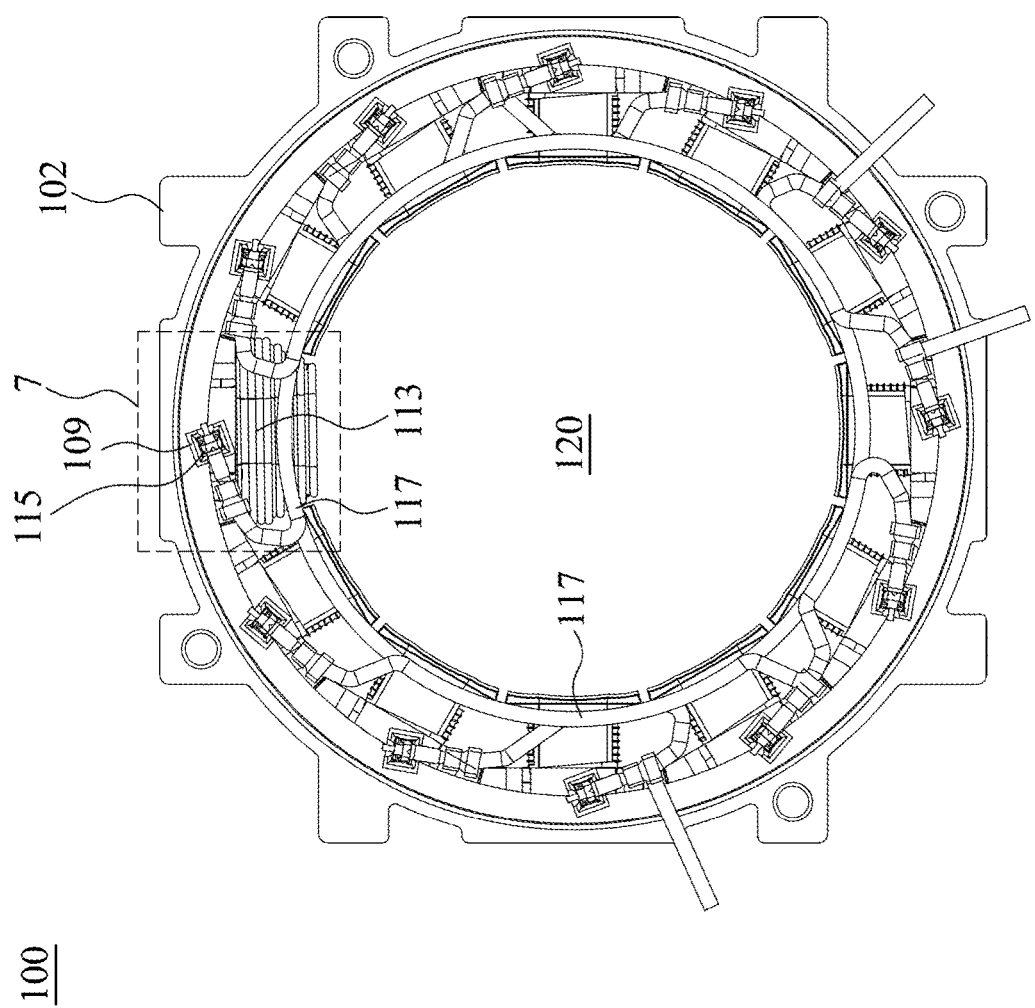
FIG. 6 illustrates a top view of a rotary motor stator according to one embodiment of the present disclosure.
Figure 7:
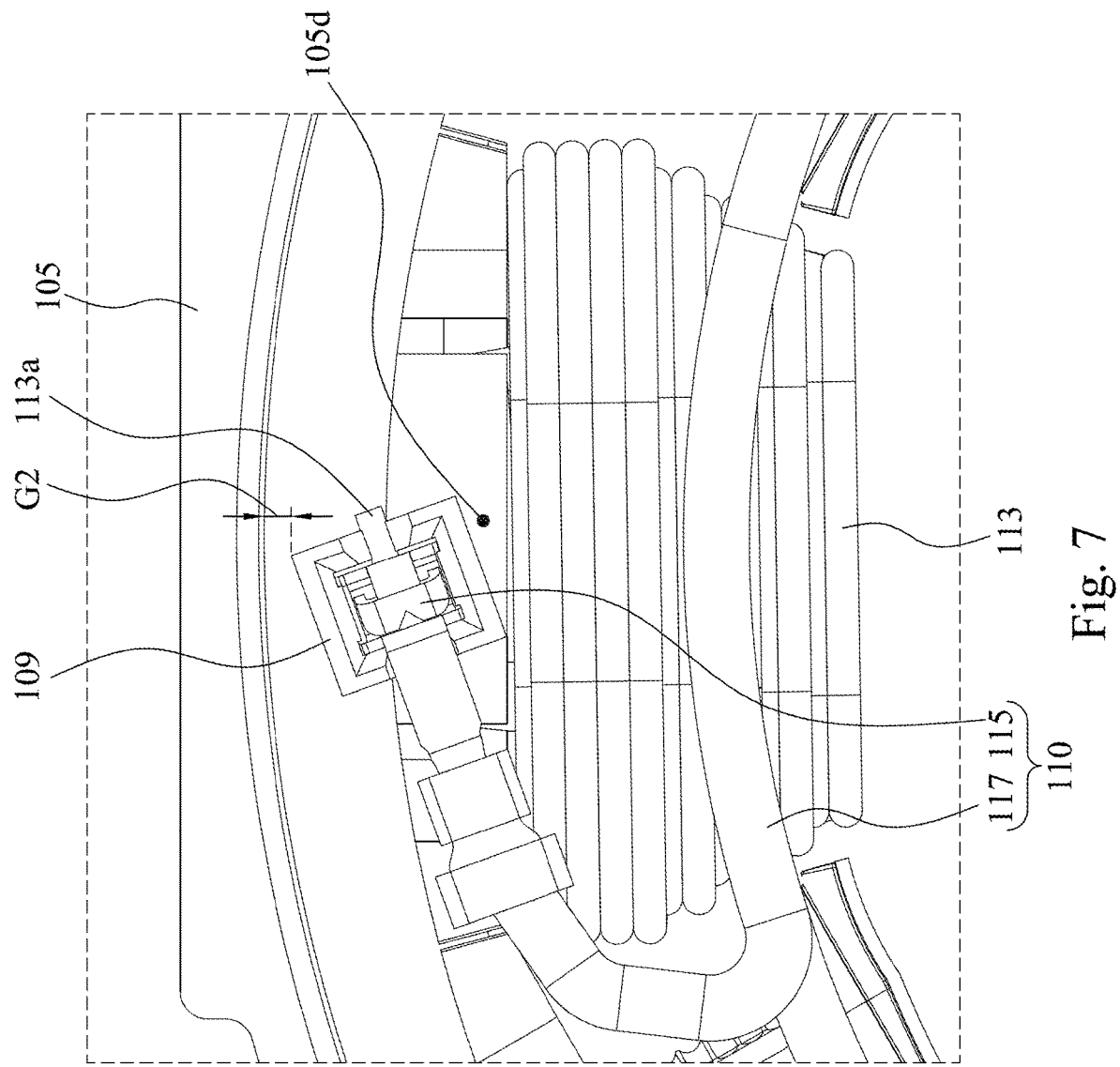
FIG. 7 illustrates an enlarged view of the rotary motor stator in FIG. 6.

Reference is made to FIGS. 6 and 7. FIG. 6 illustrates a top view of a rotary motor stator according to one embodiment of the present disclosure, and FIG. 7 illustrates an enlarged view of the rotary motor stator in FIG. 6. There is an insulating gap G2 formed between each terminal securing block 109 and the metal ring frame 102, and the first wire slot 109b of the terminal securing block 109 is arranged in a skewed state, which is beneficial to position the end 113a of the coil 113 in the first wire slot 109b to be spaced from the metal ring frame 102, i.e., increasing the insulation gap, to avoid the problem of high-voltage arc discharge. Each terminal securing block 109 is used for inserting a terminal 115 to be electrically connected to the end 113a of the coil 113. An exposed end of the terminal 115 is connected to a tie conductor member 117 so as to form a desired stator winding. The tie conductor member 117 is arranged between the rotor accommodation space 120 and the terminal securing blocks 109 to avoid interference with a rotation of the rotor. The skew arranged state of the first wire slot 109b of the terminal securing block 109 is also beneficial to widen a wiring area for the tie conductor member 117. In addition, the configuration of the terminal securing block 109 deviating from the center 105d of the outer side 105c is also conducive to the advantage of shortening a reserve length of the coil 113. In some embodiments of the present disclosure, the tie conductor member 117 may be a flexible wire or a sheet metal part.

Figure 8:
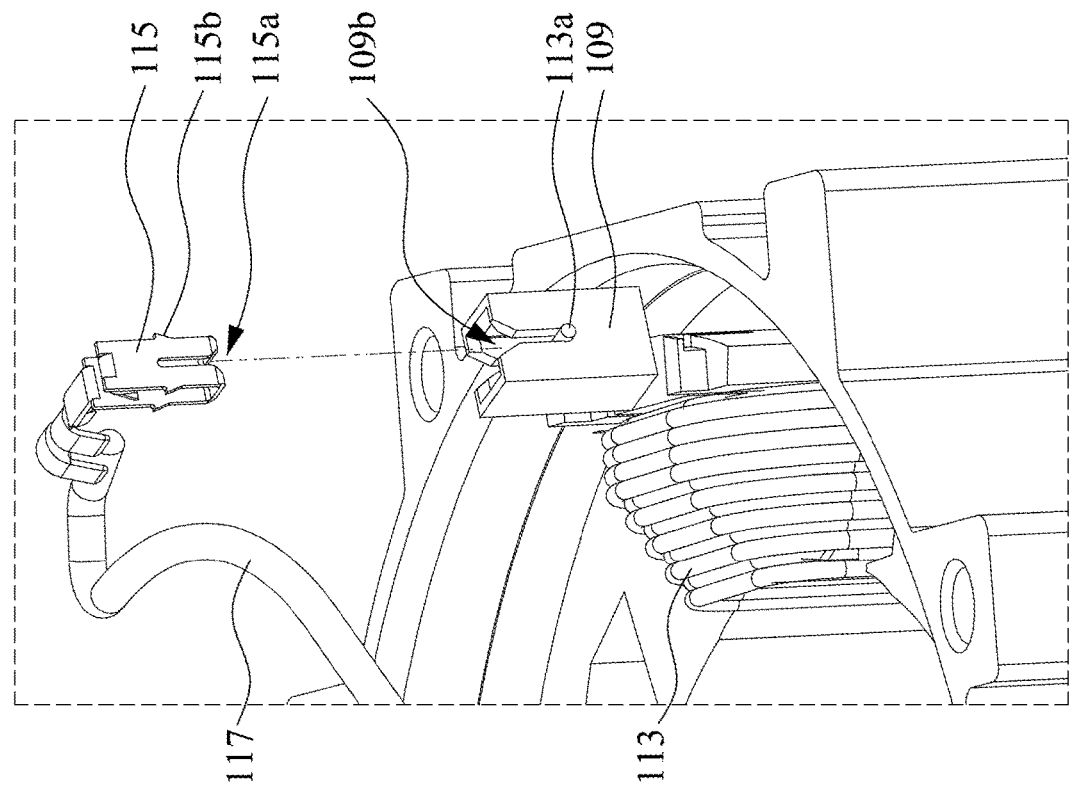
FIGS. 8-9 illustrate enlarged views of the rotary motor stator to show how a terminal is inserted into a corresponding terminal securing block.
Figure 9:
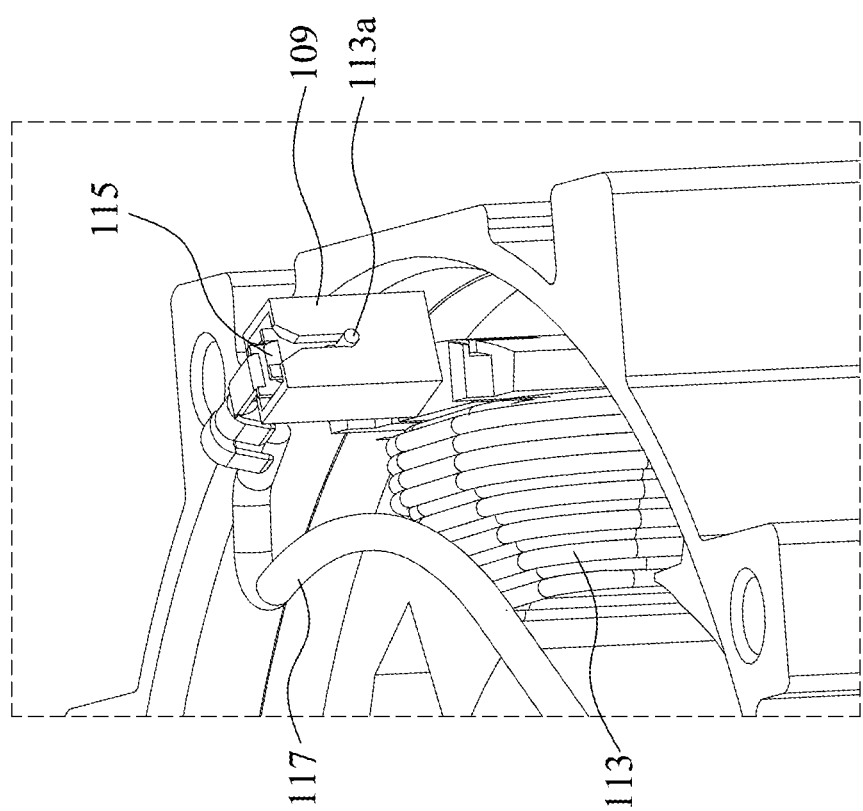

Reference is made to FIGS. 8 and 9, which illustrate enlarged views of the rotary motor stator to show how a terminal is inserted into a corresponding terminal securing block. The terminal securing block 109 has a first wire slot 109b, and each terminal 115 has a second wire slot 115a. When each terminal 115 is inserted into a corresponding terminal securing block 109, the second wire slot 115a and the first wire slot 109b are aligned with each other to clamp an end 113a of the coil 113. In addition, the terminal 115 inserting into the terminal securing block 109 also has the function of stripping off the insulating outer layer of the clamped coil 113 such that the coil 113 can be electrically connected to the terminal 115. Each terminal 115 has a hook 115b such that the terminal 115 can be inserted into each corresponding terminal securing block 109 to achieve the purpose of being reliably fastened and not easily to fall off.

In sum, the rotary motor stator disclosed herein has its wire slot of the terminal securing block in a skewed state, and the coil end clamped by the wire slot also has a skew angle, which increases an insulation gap between the coil end and the metal ring frame to avoid the problem of high-voltage arc discharge due to a close gap between the coil end and the metal ring frame. At the same time, increasing the distance between the terminal securing blocks and the rotor accommodation space may also widen the wiring area to avoid unnecessary interference when the rotor rotates.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A rotary motor stator comprising:
   a plurality of stator teeth arranged in a ring to define a rotor accommodation space, wherein each stator tooth comprises an inner side, a winding section and an outer side, the inner side is closer to the rotor accommodation space than the outer side, and the winding section is located between the inner side and the outer side for winding a coil;
   a plurality of terminal securing blocks, each terminal securing block is fixed to the outer side of each stator tooth, and each terminal securing block includes a first wire slot configured to secure an end of the coil; and
   a metal ring frame accommodating the ring of the stator teeth,
   wherein an angle between a line passing through a center of the ring and a center of each terminal securing block and a lengthwise direction of the first wire slot is an acute angle,
   wherein a gap is formed between each terminal securing block and the metal ring frame.

2. The rotary motor stator of claim 1, wherein the angle ranges from 10° to 85°.

3. The rotary motor stator of claim 1, wherein the center of each terminal securing block is not located in a center of the outer side of each stator tooth.

4. The rotary motor stator of claim 1 further comprising a plurality of terminals, and each terminal is inserted into a corresponding one of the terminal securing blocks.

5. The rotary motor stator of claim 4, wherein each terminal comprises a second wire slot, the first wire slot and the second wire slot are aligned to secure the end of the coil when each terminal is inserted into a corresponding one of the terminal securing blocks.

6. The rotary motor stator of claim 4 further comprising a tie conductor member connected to the terminals.

7. The rotary motor stator of claim 6, wherein the tie conductor member is located between the rotor accommodation space and the terminal securing blocks.

8. The rotary motor stator of claim 1, wherein another gap is formed between any immediately adjacent two of the stator teeth.

9. A rotary motor stator comprising:
   a plurality of stator teeth arranged in a ring to define a rotor accommodation space, wherein each stator tooth comprises an inner side, a winding section and an outer side, the inner side is closer to the rotor accommodation space than the outer side, and the winding section is located between the inner side and the outer side for winding a coil;
   a plurality of terminal securing blocks, each terminal securing block is fixed to the outer side of each stator tooth, wherein each terminal securing block is located between a center and an edge of the outer side of each stator tooth; and
   a metal ring frame accommodating the ring of the stator teeth,
   wherein a gap is formed between each terminal securing block and the metal ring frame.

10. The rotary motor stator of claim 9, wherein each terminal securing block includes a first wire slot configured to secure an end of the coil.

11. The rotary motor stator of claim 10, wherein an angle between a line passing through a center of the ring and a center of each terminal securing block and a lengthwise direction of the first wire slot is an acute angle.

12. The rotary motor stator of claim 11, wherein the angle ranges from 10° to 85°.

13. The rotary motor stator of claim 10 further comprising a plurality of terminals, and each terminal is inserted into a corresponding one of the terminal securing blocks.

14. The rotary motor stator of claim 13, wherein each terminal comprises a second wire slot, the first wire slot and the second wire slot are aligned to secure the end of the coil when each terminal is inserted into a corresponding one of the terminal securing blocks.

15. The rotary motor stator of claim 13 further comprising a tie conductor member connected to the terminals.

16. The rotary motor stator of claim 15, wherein the tie conductor member is located between the rotor accommodation space and the terminal securing blocks.

* * * * *